Dec. 18, 1962 M. J. LENETT 3,069,150
AUXILIARY SPRING CONSTRUCTION FOR VEHICLES
Filed Oct. 20, 1961
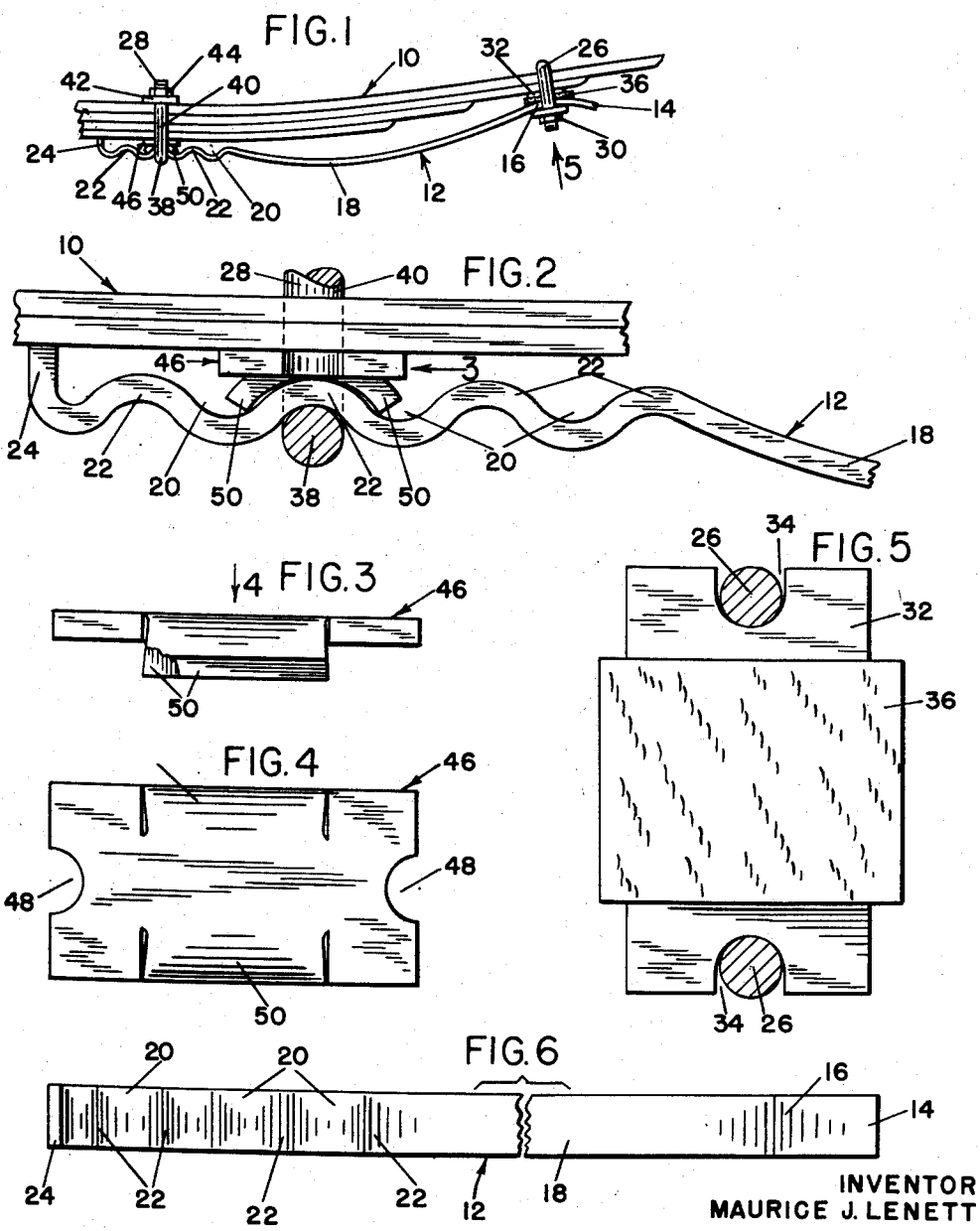
INVENTOR
MAURICE J. LENETT
ATTORNEY

United States Patent Office 3,069,150
Patented Dec. 18, 1962

3,069,150
AUXILIARY SPRING CONSTRUCTION
FOR VEHICLES
Maurice J. Lenett, % Lenco Spring Inc.,
383 Southbridge St., Worcester, Mass.
Filed Oct. 20, 1961, Ser. No. 146,485
5 Claims. (Cl. 267—48)

This invention relates to a new and improved auxiliary spring construction for vehicles which is particularly adapted to the conventional leaf spring assembly especially at the rear axle of the vehicle, and the improvement resides in the provision of a device for applying extra stiffness, rigidity and strength to said springs for a greater weight carrying capacity for the vehicle and also to aid in preventing sway and to stiffen the spring action of the car over rough roads.

A further object of the invention resides in the device described which is adjustable quickly and easily for the purpose of applying different degrees of stiffness and rigidity to the vehicle spring by moving the device itself longitudinally with respect to the spring while utilizing a new and improved but simple and inexpensive connecting device therefor.

Another object of the invention resides in the provision of a relatively elongated bowed leaf spring having a bearing surface at one end thereof for contacting the under side of the leaf spring assembly of the vehicle and at the opposite end thereof having a series of indentations, together with a lock device adapted to secure said auxiliary spring to the under side of the leaf spring in adjusted position, said lock device including a pair of downwardly extending projections forming a saddle or socket for cooperation with any one selectively of a series of ridges provided in said auxiliary spring assembly and thus providing for adjustment of the bearing portion of said auxiliary spring with reference to its attachment point on the spring.

Other objects and advantages of the invention will appear hereinafter.

Reference is to be had to the accompanying drawings, in which

FIG. 1 is a view in side elevation illustrating the auxiliary spring in position on the conventional spring assembly of a vehicle;

FIG. 2 is an enlarged view illustrating the adjustable connection between the auxiliary spring and the conventional spring;

FIG. 3 is an edge view of the connecting member, looking in the direction of arrow 3 in FIG. 2;

FIG. 4 is a plan view thereof, looking in the direction of arrow 4 in FIG. 3;

FIG. 5 is a plan view, looking in the direction of arrow 5 of FIG. 1 of a bearing member for the auxiliary spring, and FIG. 6 is a plan view of the auxiliary spring.

In illustrating the present invention, there is shown generally indicated by the reference numeral 10 a conventional leaf spring assembly for vehicles. This may be attached to the vehicle in any way desired without departing from the scope of the invention. The novel auxiliary spring is generally indicated by the reference numeral 12 and it comprises an elongated springy member having a downturned lip 14 at one end thereof, this lip forming an upwardly bowed bearing area 16. Inwardly from the bearing area at 16 there is a downwardly bowed central portion 18 which forms the main part of the auxiliary spring and at its other end this terminates in a series of wave-like troughs, these being indicated by the reference numeral 20. These troughs form upwardly bowed crest-like adjustment areas 22 and there may be as many of these as desired. The auxiliary spring member 12 terminates adjacent the wave-like conformation 20, 22 in an upwardly extending abutment member 24 and this abuts the conventional spring 10 at the under side thereof, as is clearly shown in FIGS. 1 and 2.

The auxiliary spring member is secured to the conventional spring 10 by means of a pair of shackle bolts, these being preferably U-shaped and are indicated respectively by the reference numerals 26 and 28. Preferably the bolt 26 at one end of the spring is in inverted relationship and extends over the conventional spring 10 as will be clear to those skilled in the art, extending down past the auxiliary spring at the sides thereof and being provided with nuts, washers and the like as at 30 for securing the auxiliary spring with its bearing area 16 bearing on the outer end of the vehicle spring 10. Preferably there is disposed between the bearing area at 16 and the vehicle spring 10 a wear plate 32 best shown in FIG. 5. This plate is provided with notches 34 accommodating the legs of the U-shaped bolt 26 and also has a wear pad 36 of any desired description to prevent metal-to-metal contact between plate 34, spring 12, and the vehicle spring 10.

At the opposite end of the auxiliary spring, it is adapted to be secured to the vehicle spring 10 in a selected adjusted position according to a selected trough in the wave-like formation 20, 22. The shackle 28 is in upright condition, having a closed-end cross member at 38 and upstanding legs 40 which extend to either side of the auxiliary spring member 12 to a point above the vehicle spring 10 where a plate 42 is provided across the vehicle spring. The legs 40 of the bolt 28 being threaded are secured by nuts 44 or the like.

The closed end 38 of the U-shaped bolt 28 is disposed transversely with respect to the auxiliary spring 12 and acts as a holding means in one of the trough-like members as is clearly shown in FIG. 2. In order to hold the desired adjustment, in the longitudinal direction of auxiliary spring 12, there is provided a lock plate which is generally indicated by the reference numeral 46 and is best shown in detail in FIGS. 3 and 4. This lock plate is provided with indentations 48 at the ends thereof to accommodate the legs 40 of the U-bolt 28, and intermediate the side edges on each side thereof it is cut and bent down, forming locking spurs or the like 50.

These locking spurs 50 form between them a saddle or socket which receives a selected crest 22 of the wave-like conformation above referred to and by being rigidly held in the assembly including the bolt 28, this holds the longitudinal position of the auxiliary spring 12 in its desired adjustable position.

It will be seen that if it is desired to increase or decrease the stiffness imposed upon the vehicle spring, it is merely necessary to loosen the bolts 44 and 30 and shift the entire auxiliary spring 12 longitudinally and then lock it in a selected position by means of the locking plate 46 as above described.

Having thus described my invention and the advantages thereof, I do not wish to be limited to the details herein disclosed, otherwise than as set forth in the claims, but what I claim is:

1. The combination with a conventional vehicle leaf spring assembly with an auxiliary spring member including means securing the auxiliary spring member in position underneath the vehicle spring in longitudinally adjustable position relative thereto, said auxiliary spring member comprising a single bowed leaf spring element having at one end thereof a bearing surface adapted to bear upwardly on the under side of the vehicle spring, the securing means detachably fastening the spring element at the opposite end thereof to the vehicle spring, said spring element having a wave-like conformation providing a series of troughs and alternate crests extending transversely of the spring element, said securing means including a member engageable in a selected trough at the under side of said spring element, a locking element interposed between the spring element and the vehicle spring, means on said locking element disposed at either side of a crest corresponding to said trough and locating the spring in selected longitudinally adjusted position.

2. The combination recited in claim 1 including an abutment on said auxiliary spring element adjacent the wave-like conformation and abutting the under side of the vehicle spring assembly.

3. The combination recited in claim 1 wherein said locking element comprises a plate extending transversely with respect to said auxiliary spring element, said plate having notches therein at opposite edges thereof for receiving the legs of the U bolt and locating the locking plate in position.

4. The combination recited in claim 1 wherein said locking element comprises a plate extending transversely with respect to said auxiliary spring element, said locking element spring locating means including bent down tabs at opposite sides of the locking plate.

5. The combination with a conventional vehicle leaf spring assembly with an auxiliary spring member including means securing the auxiliary spring member in position underneath the vehicle spring in longitudinally adjustable position relative thereto, said auxiliary spring member comprising a single bowed leaf spring element having at one end thereof a bearing surface adapted to bear upwardly on the underside of the vehicle spring, the securing means detachably fastening the spring element at the opposite end thereof to the vehicle spring, and including a U-shaped bolt, said spring element having a wave-like conformation providing a series of troughs and alternate crests extending transversely of the spring element, and said U-shaped bolt having a closed end engageable in a selected trough at the under side of said spring element, a locking element interposed between the spring element and the vehicle spring, means on said locking element disposed at either side of a crest corresponding to said trough and locating the spring in selected longitudinally adjacent position, and means fastening said U-shaped bolt in position securing the auxiliary spring element, locking plate, and vehicle spring assembly together.

References Cited in the file of this patent

UNITED STATES PATENTS

| | | |
|---|---|---|
| 1,671,675 | Hansen | May 29, 1928 |
| 1,784,005 | Grabler | Dec. 8, 1930 |
| 1,870,787 | Smith | Aug. 9, 1932 |
| 2,205,086 | Dell | June 18, 1940 |
| 3,039,759 | Paller | June 19, 1962 |